United States Patent
Kleiner et al.

(10) Patent No.: US 10,949,319 B2
(45) Date of Patent: Mar. 16, 2021

(54) PERFORMANCE MONITORING AND ENHANCEMENT

(71) Applicant: EMC IP Holding Company LLC, Hopkinton, MA (US)

(72) Inventors: Vladimir Kleiner, Yehud (IL); Vladimir Shveidel, Pardes-Hana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/044,917

(22) Filed: Jul. 25, 2018

(65) Prior Publication Data
US 2020/0034266 A1    Jan. 30, 2020

(51) Int. Cl.
*G06F 11/34* (2006.01)
*G06F 11/30* (2006.01)
*G06F 9/50* (2006.01)
*G06F 9/48* (2006.01)

(52) U.S. Cl.
CPC ........ *G06F 11/3409* (2013.01); *G06F 9/4881* (2013.01); *G06F 9/5038* (2013.01); *G06F 11/3034* (2013.01); *G06F 2201/84* (2013.01)

(58) Field of Classification Search
CPC ............... G06F 11/3409; G06F 9/4881; G06F 11/3034; G06F 9/5038; G06F 2201/84
See application file for complete search history.

(56) References Cited

U.S. PATENT DOCUMENTS

| | | | | |
|---|---|---|---|---|
| 6,502,131 | B1* | 12/2002 | Vaid | H04L 1/1854 709/224 |
| 6,658,654 | B1* | 12/2003 | Berry | G06F 11/3409 714/E11.192 |
| 10,594,562 | B1* | 3/2020 | Rastogi | H04L 41/5025 |
| 2010/0271092 | A1* | 10/2010 | Zerbe | G06F 13/4243 327/161 |
| 2011/0227766 | A1* | 9/2011 | McLaughlin | H03M 1/34 341/110 |
| 2019/0278689 | A1* | 9/2019 | Perea | G06F 11/3466 |

* cited by examiner

*Primary Examiner* — Michael A Keller
(74) *Attorney, Agent, or Firm* — Daly, Crowley, Mofford & Durkee, LLP

(57) ABSTRACT

A computer implemented method including generating one or more threads to operate a storage system, the storage system including one or more system resources, and each of the one or more threads associated with one of a plurality of tasks of the storage system. The method includes updating one or more performance counters of the storage system in response to a change in operating state of one of the one or more threads. The method includes generating a performance snapshot by sampling a state of the tasks associated with the threads and the performance counters, identifying one or more intervals of performance degradation of the storage system from the performance snapshot, and determining a correlation between one or more of the plurality of tasks and the one or more identified intervals of performance degradation.

20 Claims, 11 Drawing Sheets

400

(3508, 'JR_TYPE_WC_PARAMS_background_destage', 'None', 'journal/journal_destage.c')

(3511, 'JR_TYPE_WC_PARAMS_background_cleaner', 'None', 'journal/journal_destage.c')

(2176, 'JR_TYPE_HMD_PLB_prepare_destage', 'None', 'journal/journal_destage.c')

(2178, 'JR_TYPE_PL_3WBM_prepare_destage', 'None', 'journal/journal_destage.c')

PERFORMANCE MONITORING AND ENHANCEMENT

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric. Debugging IO performance-jitter in a high-end storage system is a challenging issue problem due to multiplicity and diversity of flows running in the system and complexity of dependencies between the flows.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments provide flow-level system monitoring accompanied by methods of correlation and clustering analysis for automation of performance-jitter problem solving process. Aspects of embodiments are directed to systems and methods for performance monitoring of computer system processes, including I/O processes, and modification of those processes to reduce performance degradation identified by the performance monitoring. It will be further understood that various changes in the details, materials, and arrangements of the parts that have been described and illustrated herein might be made by those skilled in the art without departing from the scope of the following claims.

In one aspect, a method comprises: generating one or more threads to operate a storage system, the storage system comprising one or more system resources, and each of the one or more threads associated with one of a plurality of tasks of the storage system; updating one or more performance counters of the storage system in response to a change in operating state of one of the one or more threads; generating a performance snapshot by sampling a state of the tasks associated with the threads and the performance counters; identifying one or more intervals of performance degradation of the storage system from the performance snapshot; determining a correlation between one or more of the plurality of tasks and the one or more identified intervals of performance degradation.

In another aspect, a computer processing system comprises: one or more processors programmed and configured to cause the execution of: generating one or more threads to operate a storage system, the storage system comprising one or more system resources, and each of the one or more threads associated with one of a plurality of tasks of the storage system; updating one or more performance counters of the storage system in response to a change in operating state of one of the one or more threads; generating a performance snapshot by sampling a state of the tasks associated with the threads and the performance counters; identifying one or more intervals of performance degradation of the storage system from the performance snapshot; determining a correlation between one or more of the plurality of tasks and the one or more identified intervals of performance degradation.

In a further aspect, an article comprising a non-transitory computer-readable medium, comprises instructions that enable a machine to perform: generating one or more threads to operate a storage system, the storage system comprising one or more system resources, and each of the one or more threads associated with one of a plurality of tasks of the storage system; updating one or more performance counters of the storage system in response to a change in operating state of one of the one or more threads; generating a performance snapshot by sampling a state of the tasks associated with the threads and the performance counters; identifying one or more intervals of performance degradation of the storage system from the performance snapshot; determining a correlation between one or more of the plurality of tasks and the one or more identified intervals of performance degradation.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
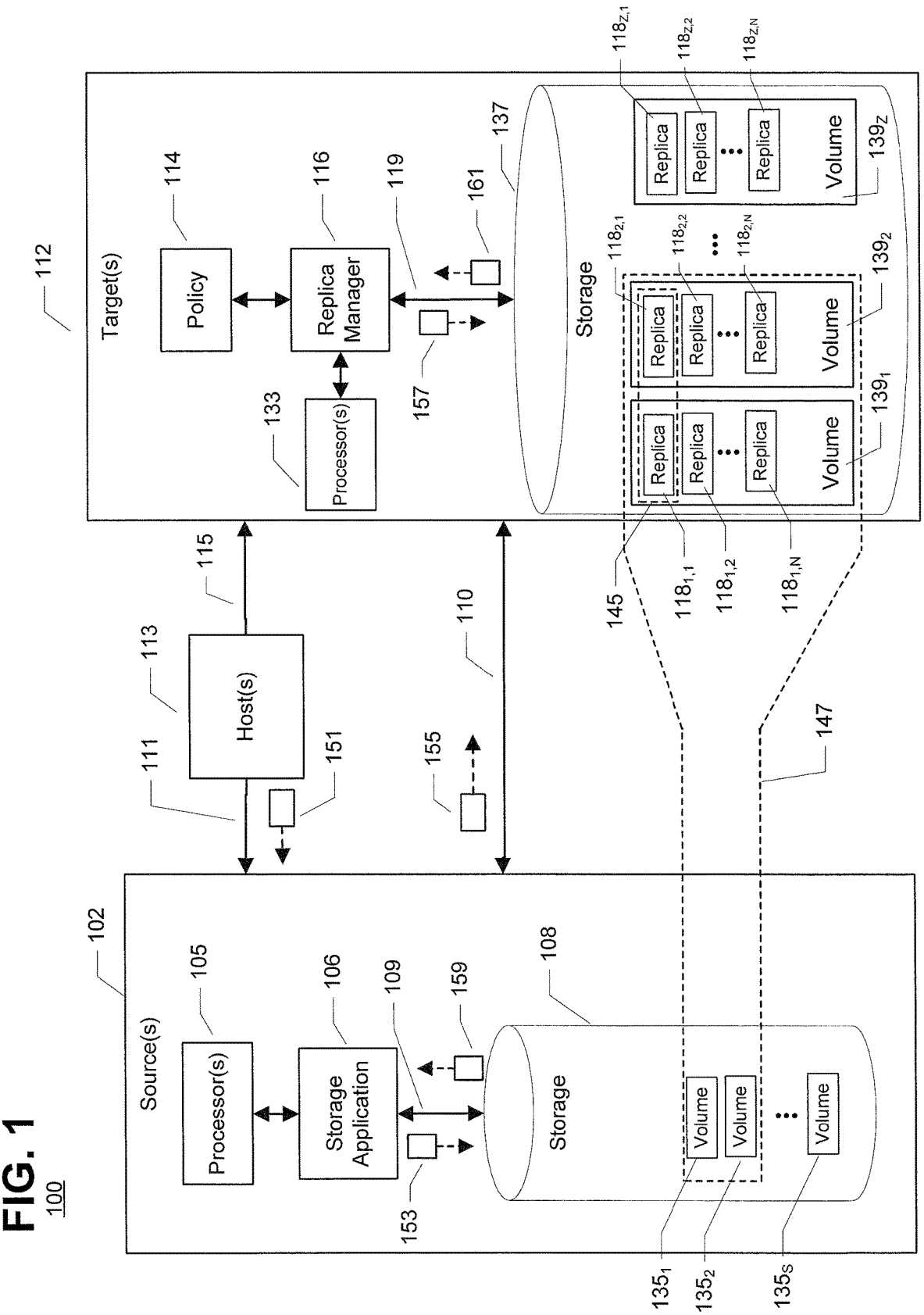
FIG. 1 is a block diagram of an example of a storage system in accordance with an illustrative embodiment.

FIG. 1 shows an example storage system 100, in accordance with illustrative embodiments. Storage system 100 may include at least one source site 102 and at least one target site 112, which may be co-located or geographically separated. Source site 102 may include one or more processors 105, storage application 106, and storage 108. In some embodiments, storage 108 may include one or more storage volumes $135_{1-S}$, that operate as active or production volumes. Source site 102 and target site 112 may be in communication with one or more hosts 113 via communication links 111 and 115, respectively.

Hosts 113 may perform input/output (I/O) operations on source-side storage 108 (e.g., read data from and write data to storage 108). In some embodiments, the I/O operations may be intercepted by and controlled by storage application 106. As changes are made to data stored on storage 108 via the I/O operations from hosts 113, or over time as storage system 100 operates, storage application 106 may perform operations to replicate data from source site 102 to target site 112 over communication link 110. In some embodiments, communication link 110 may be a long distance communication link of a storage area network (SAN), such as an Ethernet or Internet (e.g., TCP/IP) link that may employ, for example, the iSCSI protocol. In some embodiments, one or both of source site 102 and/or target site 112 may include one or more internal (e.g., short distance) communication links (shown as communication links 109 and 119), such as an InfiniBand (IB) link or Fibre Channel (FC) link. Communication link 109 may be employed to transfer data between storage volumes $135_{1-S}$ of storage 108 and one or both of storage application 106 and processor(s) 105. Communication link 119 may be employed to transfer data between storage volumes $139_{1-Z}$ of storage 137 and one or both of replica manager 116 and processor(s) 133.

In illustrative embodiments, target site 112 may include replica manager 116 that manages a plurality of replicas $118_{1-N}$ according to a policy 114 (e.g., a replication and/or retention policy). Replicas 118 may be stored in one or more volumes $139_{1-Z}$ of storage 137 of target site 112. A replica (or snapshot) may be created from data within storage 108 and transferred to one or more target sites 112 during a data replication cycle that may be performed based on data replication policies (e.g., policy 114) that may define various settings for data recovery operations. A data replication cycle may be asynchronous data replication performed at time-based intervals during operation of storage system 100, or may alternatively be synchronous data replication performed when data is changed on source site 102.

In illustrative embodiments, storage system 100 may include one or more consistency groups. A consistency group 147 may include one or more volumes 135 of source site 102, each associated with a corresponding volume 139 of target site 112. Consistency group 147 may treat source volumes 135 and target volumes 139 as a single logical entity for data replication and migration. Each volume 139 may store one or more associated replicas 118 that reflect the data in the consistency group 147 at a point in time (e.g., when the replica 118 was created). For example, replicas (e.g., snapshots) 118 may be generated for each source volume 135 of consistency group 147 at the same time, and stored on associated ones of target volumes 139. As shown in FIG. 1, an illustrative consistency group 147 may include two source volumes $135_1$ and $135_2$ and two target volumes $139_1$ and $139_2$. Each of target volumes $139_1$ and $139_2$ may include one or more replicas 118. In some embodiments, replicas 118 for respective source volumes 135 of consistency group 147 may be grouped into sets (e.g., a snapshot set or snapset 145).

Figure 2:
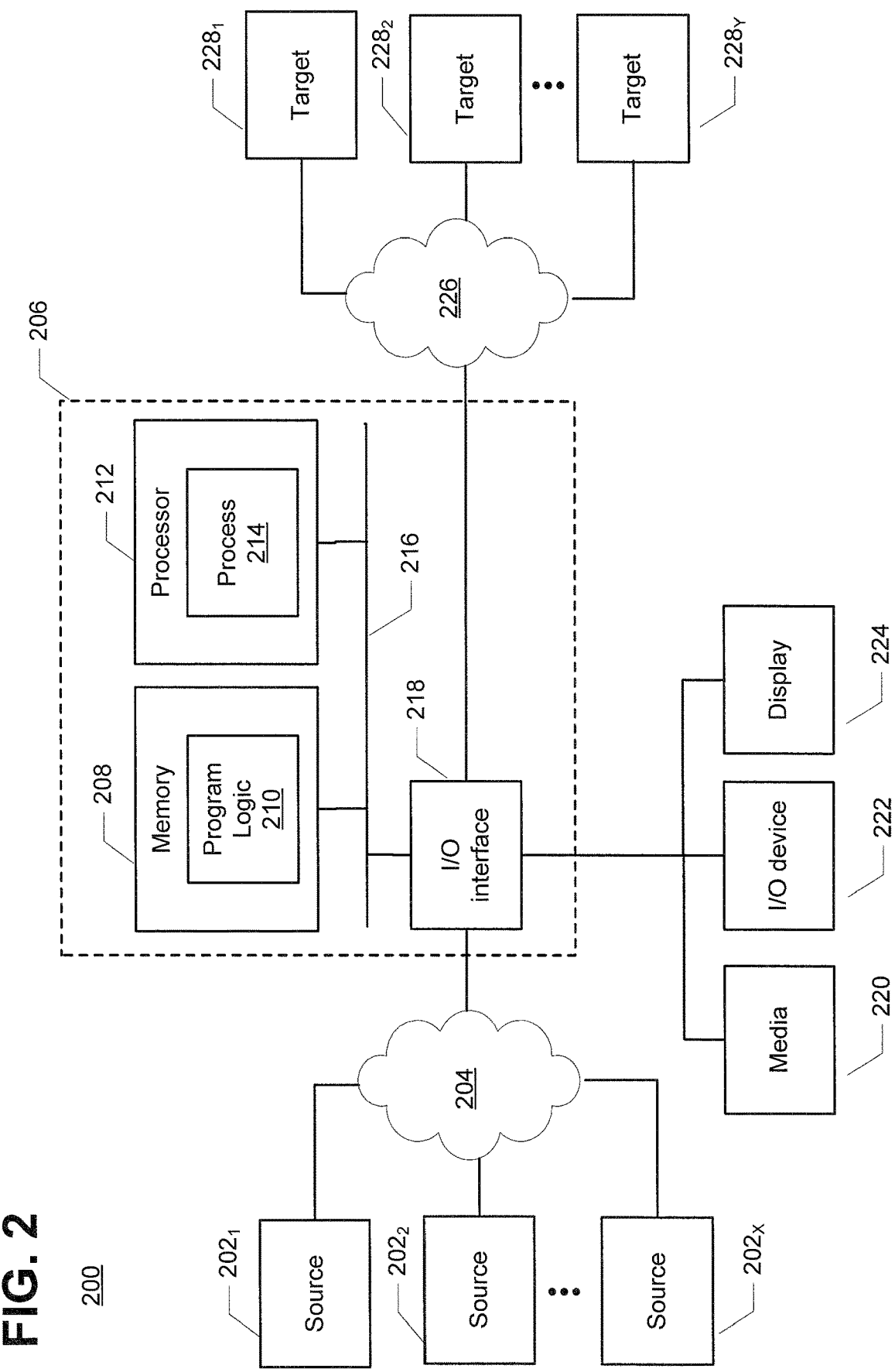
FIG. 2 is a block diagram of another example of a storage system in accordance with an illustrative embodiment.

Referring to FIG. 2, in an illustrative embodiment, apparatus 206 may form part of system 200 and include memory 208 storing program logic 210, processor 212 for executing process 214, and communications I/O interface 218, connected via a bus 216 to allow communication between memory 208, processor 212 and devices external to apparatus 206. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via network 204. In some embodiments; communications I/O interface 218 may couple apparatus 206 to one or more target devices $228_1$-$228_Y$ via network 226. In some embodiments, network 226 of FIG. 2 may be a communication fabric between volumes of targets 228. For example, in some embodiments, network 226 may be an InfiniBand (IB) network or a Fibre Channel (FC) network.

Figure 3A:
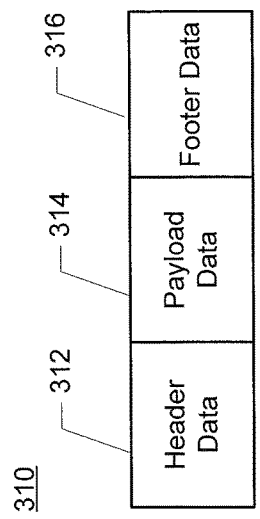
FIG. 3A is a block diagram of an example data packet of an input/output (I/O) operation of the storage system of FIG. 1 in accordance with an illustrative embodiment.

Referring back to FIG. 1, in some embodiments, one of hosts 113 may send an I/O request (e.g., I/O request 151) to perform an I/O operation on storage 108 of source site 102. For example, I/O request 151 may be a request to read an associated amount of data from storage 108, or may be a request to write an associated amount of data to storage 108. In some embodiments, I/O request 151 may include one or more data packets. For example, FIG. 3A shows a block diagram of an illustrative data packet 310. As shown in FIG. 3A, in some embodiments, data packet 310 may include one or more of header data 312, payload data 314 and footer data 316. Payload data 314 may be the data to be written to storage 108 or data that is read from storage 108 (e.g., user data), and header data 312 and/or footer data 316 may be data associated with I/O request 151 that may be employed by storage system 100 to process I/O request 151 (e.g., source and/or destination address information, error correction information, data and/or packet format information, metadata, and other information).

In some embodiments, payload data 314 may be segmented into one or more payload data segments to be written to storage 108 (e.g., by one or more write operations 153) or read from storage 108 (e.g., by one or more read operations 159). For example, if payload data 314 is 256 KB, payload data 314 may be segmented into sixteen 16 KB payload data segments to be written to storage 108. When I/O request 151 is a write request, processor(s) 105 and/or storage application 106 may then perform one or more corresponding write operations (e.g., write operation 153) to write payload data associated with the one or more data packets (e.g., one or more payload data segments) of I/O request 151 to storage 108. When I/O request 151 is a read request, processor(s) 105 and/or storage application 106 may then read data from storage 108 in one or more packets (e.g., one or more read operations 159) to process I/O request 151 from storage 108.

In illustrative embodiments, source site 102 may send a replica (e.g., replica 155) to target site 112. Similarly to write request 151, replica 155 may include one or more data packets such as shown in FIG. 3A. Processor(s) 133 and/or replica manager 116 may then perform one or more corresponding write operations (e.g., write operation 157) to write payload data (e.g., one or more payload data segments) associated with the one or more data packets of replica 155 to storage 137. Similarly, replica manager 161 may read replica data from storage 137 by one or more read operations 161. In some embodiments, data packet 310 may be a data packet formatted in accordance with the TCP/IP and iSCSI protocols.

Figure 3B:
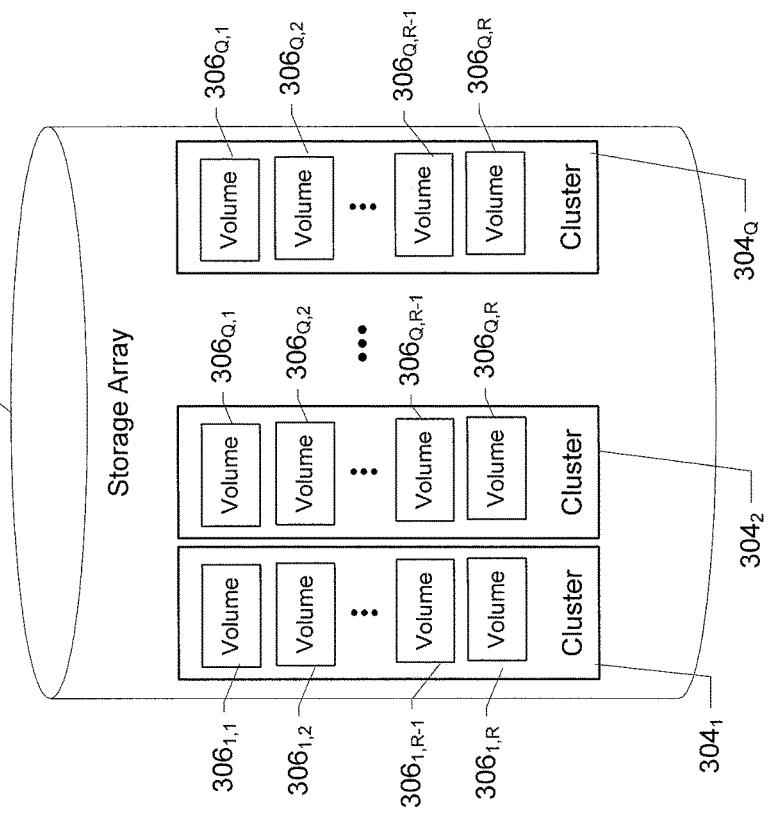
FIG. 3B is a block diagram of an example storage array of the storage system of FIG. 1 in accordance with an illustrative embodiment.

Referring to FIG. 3B, a block diagram of an illustrative storage array 302 is shown. For example, in illustrative embodiments, one or both of storage 108 and storage 137 may be implemented as storage array 302. As shown, in some embodiments, storage array 302 may include one or more clusters $304_1$-$304_Q$ (referred to generally as clusters 304) where Q may be a positive integer. In illustrative embodiments, clusters 304 may include one or more physical and/or virtual storage volumes, shown generally as storage volumes 306. For example, cluster $304_1$ may include storage volumes $306_{1,1}$-$306_{1,R}$, where R may be a positive integer. For example, clusters 304 may include one or more physical storage volumes such as hard disk drives (HDDs), solid state drives (SSDs) such as flash drives, a hybrid magnetic and solid state drive, etc., and/or one or more virtual storage volumes, such as a cloud storage, or a combination of physical storage volumes and virtual storage volumes.

Described embodiments provide performance analysis of storage system 100. Some embodiments may employ one or more performance counters associated with resources of storage system 100 (e.g., CPU resources, operating system resources, etc.), and one or more application-specific or task-specific performance counters associated with individual applications, services or tasks of storage system 100. Described embodiments provide a manner for identifying relationships between the various performance counters and the application flow without requiring manual instrumentation upgrades with each new version of operating system (OS) software for storage system 100.

Figure 3C:
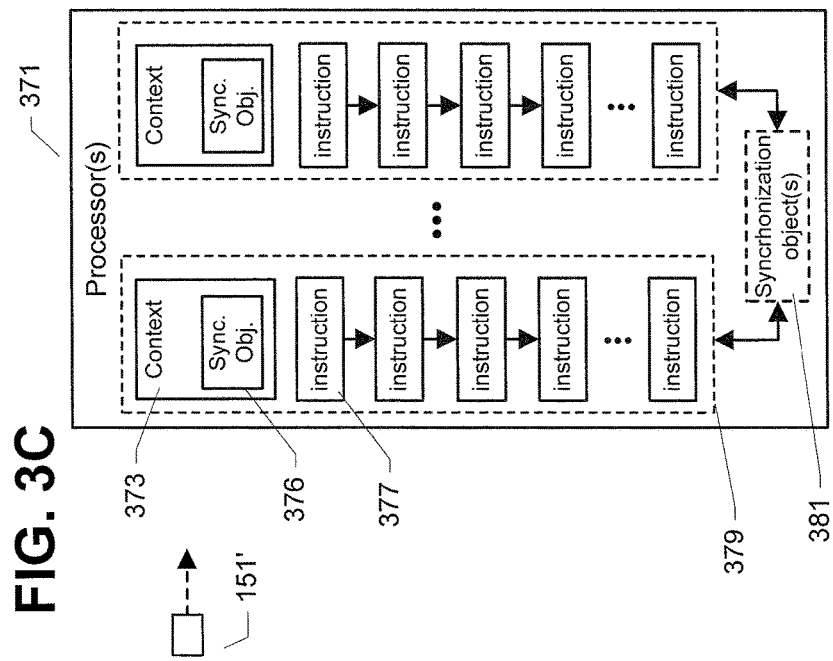
FIG. 3C is a block diagram showing example threads of the storage system of FIG. 1 in accordance with an illustrative embodiment.

Described embodiments may employ one or more threads to perform operations of storage system 100 (e.g., operations associated with I/O request 151). For example, as shown in FIG. 3C, processors 371 (e.g., one or more or processors 105 and/or processors 133) may employ one or more threads 379. Each thread 379 may be a thread of one or more instructions 377 that are performed by storage system 100. Each thread 379 may also include context 373. Context 373 may include one or more synchronization objects 376. In some embodiments, threads 379 may optionally be in communication with one or more external synchronization objects 381. For example, synchronization objects 376 and/or 381 may include a lock, a semaphore, or an event, by which threads may communicate with one another.

Illustrative embodiments may monitor performance of threads (e.g., 379) that are grouped by the application-level task the threads perform. For example, some embodiments may group threads based on the thread's entry function and/or an additional operation code.

Some embodiments may monitor performance of tasks using directed-graphs (diagrams). The performance data may be collected in one or more points-of-interest into performance data containers. Performance data containers may be presented as nodes and edges of the directed-graph related to a specific task. For example, a performance data container may be represented as a node of a directed-graph for a specific task. An example of a performance data container that may be represented as a node is an OS synchronization object (e.g., synchronization objects 376 and/or 381 of FIG. 3C). Sequences of processor instructions (e.g., instructions 377 of FIG. 3C) between two nodes may be represented as edges of a directed-graph for a specific task. Since each node represents a system resource, data structure or a stage of processing for a given task, the directed-graph provides a visual representation of processing flows for a given task.

Figure 6:
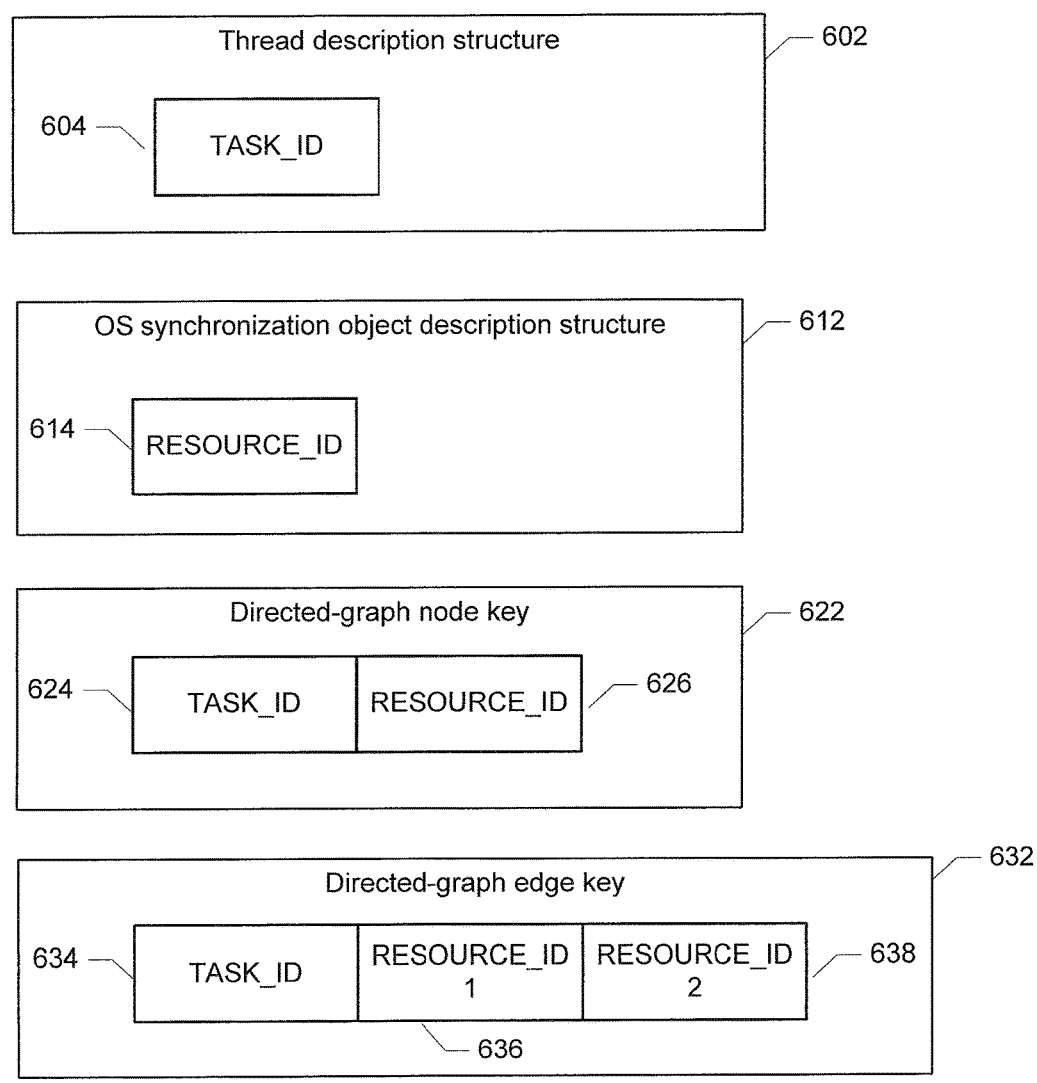
FIG. 6 is a block diagram of illustrative data structures of a performance snapshot in accordance with an illustrative embodiment.

Referring to FIG. 6, illustrative data structures employed to track the performance of storage system 100 are shown. As shown, thread description structure 602 may include an associated TASK_ID 604. OS synchronization object description structure 612 may include an associated RESOURCE_ID 614. Directed-graph node key 622 may include an associated TASK_ID 624 and an associated RESOURCE_ID 626 (performance data counters are collected for each graph node), and directed-graph edge key 632 may include an associated TASK_ID 634, an associated first RESOURCE_ID 636, and an associated second RESOURCE_ID 638 that define the sequence of instructions between two resource nodes of the directed-graph (performance data counters are collected for each graph edge).

Figure 7:
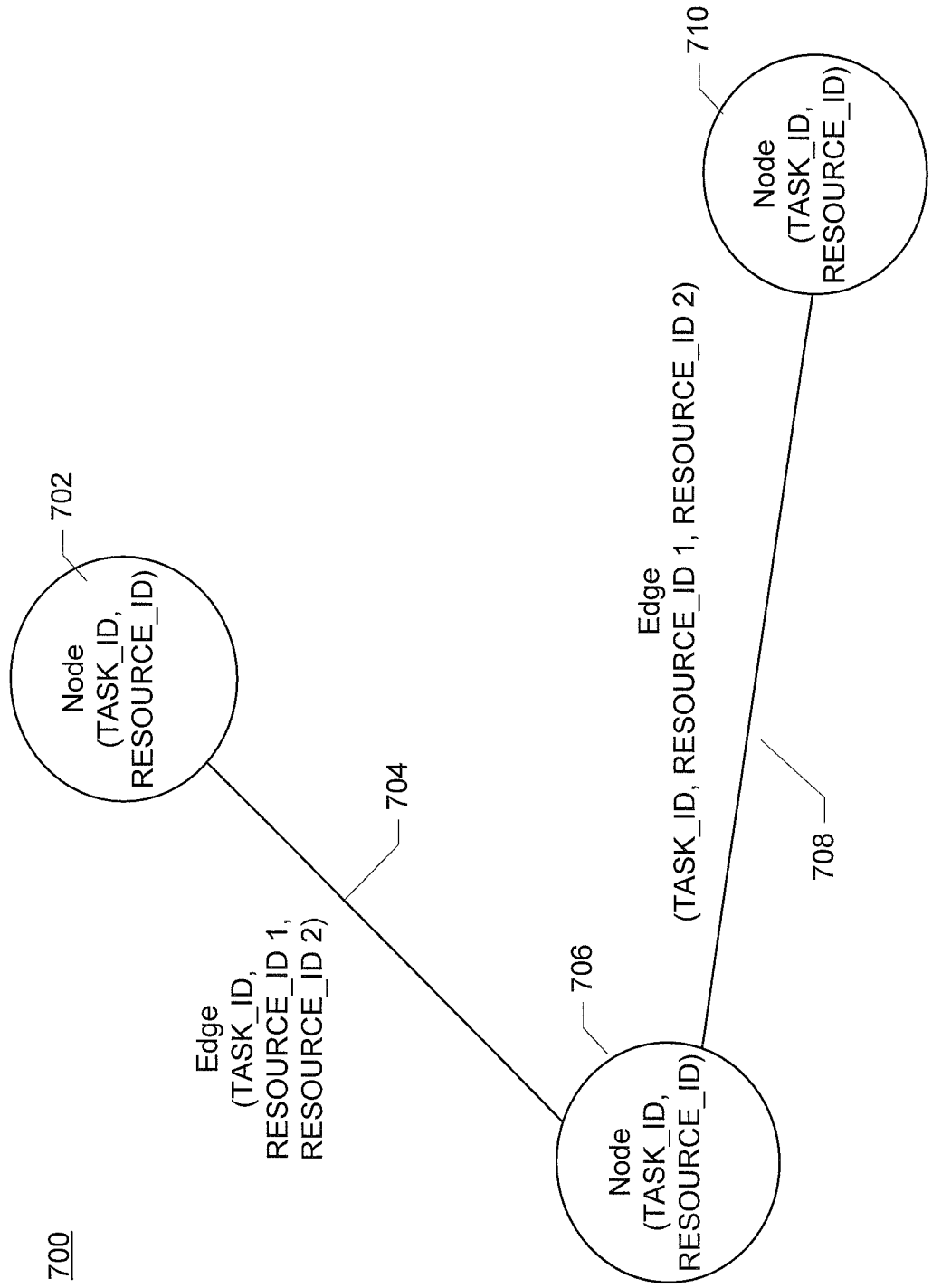
FIG. 7 is an illustrative task-specific directed-graph showing performance of the storage system in accordance with an illustrative embodiment.

Referring to FIG. 7, an illustrative directed-graph 700 is shown. As shown in FIG. 7, directed-graph 700 may include one or mode nodes, for example shown as nodes 702, 706, and 710. Each of nodes 702, 706, and 710 may have an associated key (e.g., 622 of FIG. 6) that is based upon a TASK_ID and RESOURCE_ID associated with the given node. As shown, two nodes may be joined by an associated edge, such as edges 704 and 708. Each of edges 704 and 708 may have an associated key (e.g., 632 of FIG. 6) that is based upon a TASK_ID, a first RESOURCE_ID, and a second RESOURCE_ID associated with the given node.

In described embodiments, threads may be in one of three main operating states: RUNNING, READY, or SUSPENDED. The RUNNING operating state indicates that the thread is presently running, while the READY operating state indicates that the thread is ready to be performed, but is waiting for processor resources to be available, and the SUSPENDED operating state indicates that the thread is stopped (e.g., suspended) at a synchronization object. Described embodiments may update the one or more performance counters when a thread transitions between operating states.

Described embodiments may collect application level performance data without much instrumentation (e.g., low-impact) by employing the performance counters. In illustrative embodiments, performance counters are updated upon operating state transitions of given threads, such that updating the performance counters may not require much system resources or complex tracking mechanisms. Further, described embodiments may provide for performance tracking functionality that may be upgradable with versions of software operating on storage system 100. The OS scheduler, where the performance counters are logged, is a very stable component, which is changed very rarely. With new SW version, new TASK_IDs and new RESOURCE_IDs are introduced into the system as a part of thread creation or resource initialization. These new ids are automatically included into the performance tracking system, and in this sense the system is automatically upgradable.

The one or more performance counters collected for each performance data container may vary based upon a setup of storage system 100. Some embodiments may employ performance counters to collect data for each directed-graph node, and the performance counters may include counters for accumulating a number of accesses, accumulating a number of requested units (for cases when a single access contains a batch of requested units (e.g., data blocks)), accumulating suspended time, determining an average number of suspended requests, and other data. Some embodiments may employ additional performance counters to collect data for each directed-graph edge, and the performance counters may include counters for accumulating a number of passes (e.g., a number of times a given sequence of instructions have been performed), accumulating a run time (e.g., a time in the RUNNING state), accumulating a time in the READY state, accumulating a number of cooperative yields (e.g., a number of times one thread has yielded a resource to another thread), and other data.

Described embodiments may track performance of storage system 100 by periodically generating a snapshot of the performance counters. In some embodiments, a snapshot mechanism may be implemented by an independent OS process (e.g., a process operating concurrently with other OS processes of storage system 100). For example, in an illustrative embodiment, the snapshot mechanism may operate as described in U.S. Pat. No. 9,141,290, filed May 13, 2012, entitled "Snapshot Mechanism," assigned to EMC Corporation, the teachings of which are incorporated by reference herein in their entirety. The snapshot process may utilize processor and storage resources that are not associated with high-performance flows. In other words, the snapshot process may be performed as a background and/or low-priority process of storage system 100. A snapshot interval (e.g., how frequently the snapshot process is performed) may be a tradeoff between the time-precision of the performance tracking and the system resources consumed by generating snapshots. In some embodiments, the snapshot interval may be a value set by a user of storage system 100. In some embodiments, the snapshot interval may be dynamically adjusted by storage system 100 based upon one or more operating conditions of the storage system (e.g., availability of processor 105 and/or 133, available space of storage 108 and/or 137, etc.).

Performance data containers may be identified by unique keys. In described embodiments, the keys may be based upon a globally (e.g., within storage system 100) unique task identifier (TASK_ID) associated with the task, and a globally unique resource identifier (RESOURCE_ID) associated with a resource associated with the task. For example, a thread description structure associated with each unique thread may include a field indicating the TASK_ID associated with the given thread. Similarly, each OS synchronization object (e.g., synchronization objects 376 and/or 381 of FIG. 3C) may have an associated description structure that may include a field indicating the RESOURCE_ID of the given synchronization object.

The keys for the directed-graph nodes may be two-tuples based upon the corresponding TASK_ID and RESOURCE_ID, and the keys for the directed-graph edges (e.g., sequences of processor instructions between two nodes) may be three-tuples based upon the TASK_ID and the RESOURCE_IDs for each of the two nodes that define the given edge.

Referring back to FIG. 4, a flow diagram of an illustrative process for operating storage system 100 of FIG. 1 is shown as process 400. At block 402, process 400 starts, for example when storage system 100 is powered on. At block 404, storage system 100 initializes one or more resource-specific performance counters and one or more application-specific performance counters to track performance of storage system 100. At block 406, storage system 100 generates one or more threads to operate the storage system. At block 408, storage system 100 monitors a state of each thread (e.g., RUNNING, READY, or SUSPENDED). At block 410, if the state of a given thread has changed, then at block 412, the performance counters of storage system 100 may be updated.

Process 400 returns to block 406 as threads are created and processed to operate storage system 100. If, at block 410, the state of a given thread has not changed, then process 400 returns to block 408.

As indicated by the dashed line, snapshot process 414 may be performed concurrently with (e.g., in parallel with) blocks 406, 408, 410, and 412 of process 400. At block 416, a snapshot interval may be started for generating a snapshot of the performance counter data. If, at block 418, the snapshot interval is complete, then at block 420, a snapshot of the performance counter data may be generated. Block 420 is described in greater detail in regard to FIG. 5. Snapshot process 414 returns to block 416 to begin a subsequent snapshot interval. Processes 400 and 414 may continue to operate until storage system 100 is powered off.

Figure 4:
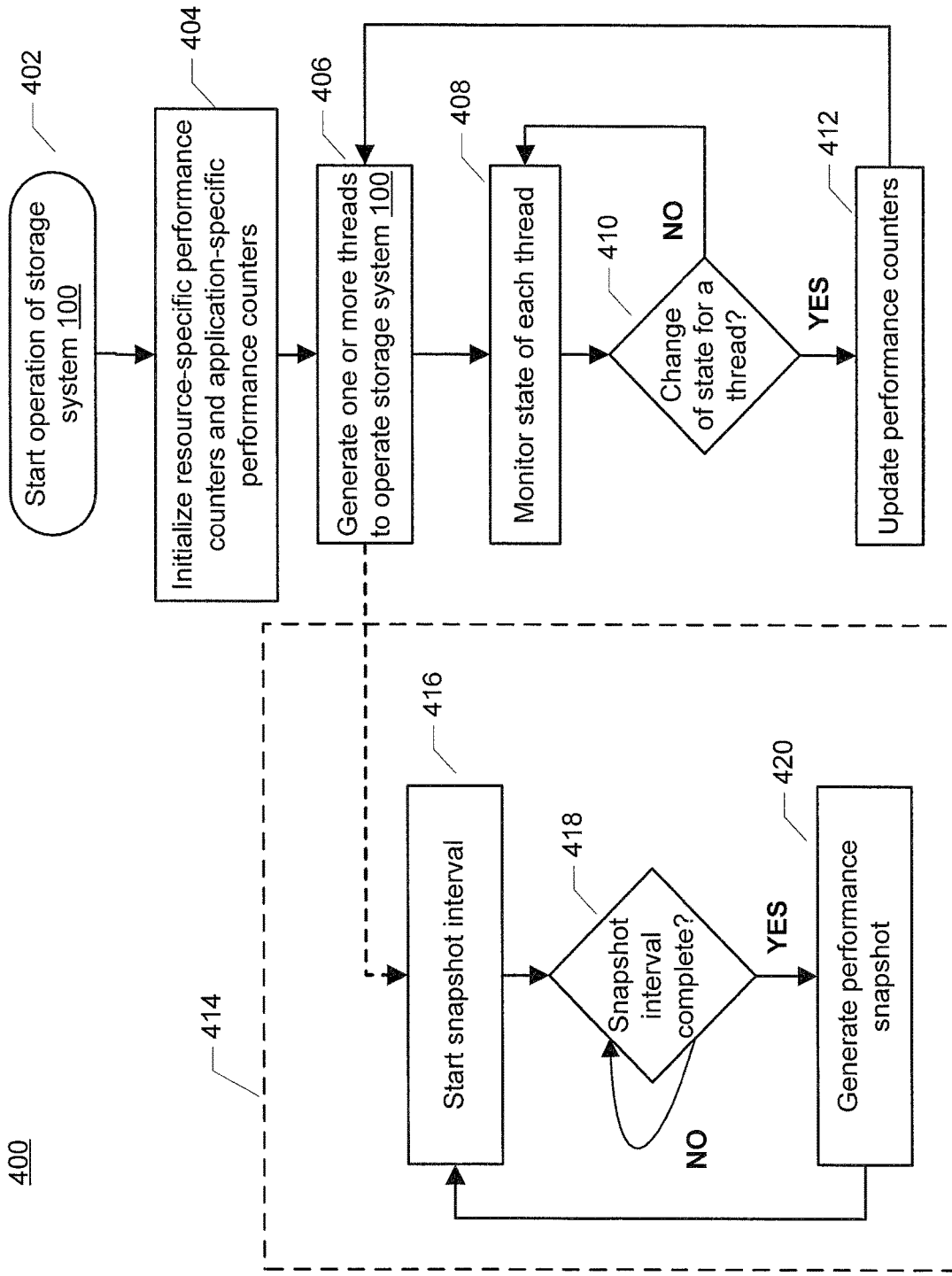
FIG. 4 is a flow diagram of an example of a process to operate the storage system of FIG. 1 in accordance with an illustrative embodiment.
Figure 5:
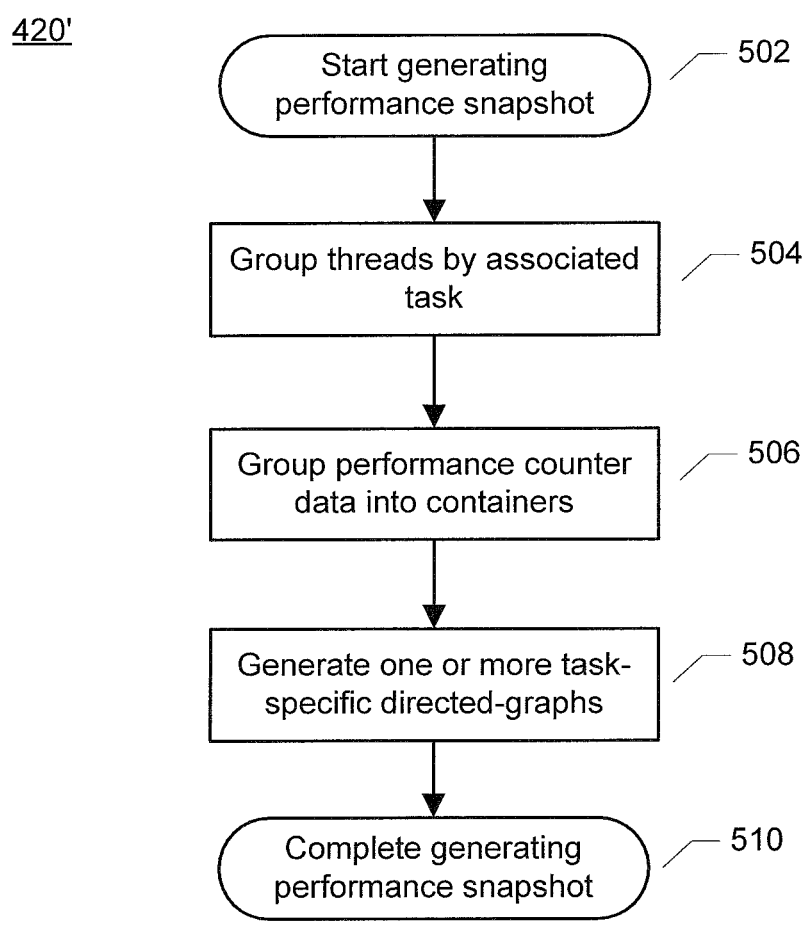
FIG. 5 is a flow diagram of an example of a process to generate a performance snapshot in accordance with an illustrative embodiment.

FIG. 5 shows additional detail of block 420 of FIG. 4 for generating a snapshot of the performance counter data, shown as process 420'. As shown in FIG. 5, process 420' may start at block 502. At block 504, storage system 100 may group one or more threads by a task associated with each thread. At block 506, performance counter data is grouped into one or more related performance data containers. For example, as described herein, a performance data container may be associated with an OS synchronization object. At block 508, one or more task-specific directed-graphs may be generated and provided to a user of storage system 100. At block 510, process 420' completes.

As noted above, a complex server system, such as a high end storage cluster includes multiple and diverse threads (flows) with complex inter-relationships between them. For example, IO-threads handle IO requests synchronously and highly depend on the client workload. Background threads, such as journals and cache de-stagers, process the data in an aggregated way and are triggered by watermarks, for example. Garbage collectors may be triggered by resource monitors and background flows may be initiated by user command (such as "delete volume").

It is understood that stable IO-performance is desirable for high end storage. Certain performance conditions, such as jittering, may be considered as a bug. Due to the multiplicity and diversity of flow types, instances, and their triggers, as described above, in combination with the sharing of common system resources, and thus mutual dependence, may make finding the cause of the performance jitter challenging.

As described above, logging of performance counters is triggered by a scheduling event when a thread state is changed from RUNNING to WAITING to READY. The counters are logged for various types of performance-data entities. As described above, a synchronization object connects the relevant synchronization object with a context of the thread's task_id, where task_id represents the flow. Examples of the collected counters are: accumulated during the sampling interval (e.g., 100 ms) include a) number of thread suspend event, b) accumulated waiting time, and, c) instant number of waiting threads. As also described above, processing sequences corresponds to a sequence of the CPU commands executed between a pair of synchronization objects. Examples of the counters collected for a processing sequence include accumulating during the sampling interval (100 ms) a) number of passes, b) accumulated run-time, and/or c) accumulated ready-time.

Recorded data contains information about time-dynamics of resource utilization for CPU, Infiniband, SSDs, NVRAM; information about thread activation rates and the like. It is probable that the cause of the system jitter is related to the time-dynamics of one or a group of these parameters. Statistical correlation and clustering analysis can be used to automatically narrow the focus of the attention of the performance analyst to the subgroup of the flows and system event that are related to the observed jitter.

In another aspect, a system can include performance monitoring of data entities of the jittering system for a time interval when the jittering is visible. Time sequences can be grouped by type. Examples include task activation rates, run-time, access-rate to SSDs subsystem, etc.

By analyzing the collected data, correlations can be identified between the time-sequences from the selected group and the observable system performance dynamics (IOPS and latency as a function of time). Depending on the specific case, one can be interested in correlations between values or their derivatives. In embodiments, to improve stability of the calculations, before transferring the data to the correlation function, values in each time-sequence can be normalized in a way that the mean value of the sequence is equal to zero and the standard deviation is equal to one, for example. The time sequences having the highest correlations can be presented to a user. In embodiments, subsets of the time-sequences having similar time-dynamics can be identified, such as by clustering processing, while the absolute values of correlations are given to the algorithm as values presenting the similarities between the entities.

Figure 8:
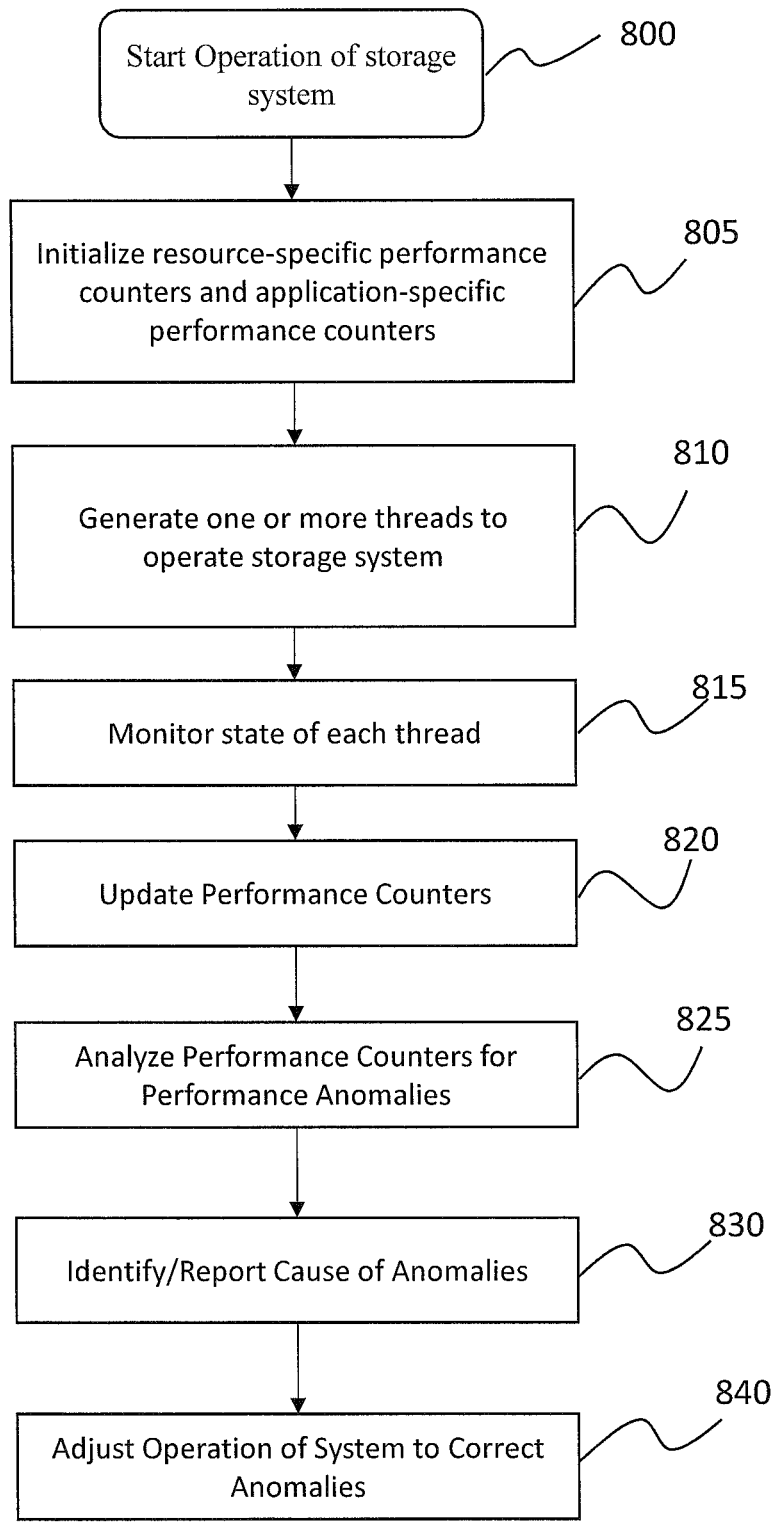
FIG. 8 is an illustrative flow diagram of a process for collecting and analyzing performance counters according to an embodiment.

FIG. 8 is an illustrative flow diagram of a process for collecting and analyzing performance counters according to an embodiment. In embodiments, data structures, such as those shown in FIG. 6 can be used. The process can begin at 800 and may include initializing resource-specific performance counters and application (or task)-specific performance counters at 805. The process includes generating one or more threads at 810 to operate the storage system to perform processes such as, for example, direct access I/O, caching/destaging, duplication, journaling, background cleanup, etc. . . . . In an embodiment, monitoring each of the threads begins at 815, after which performance counters such as those described herein are updated at 820 and can be used to eventually generate a performance snapshot of counters collected over a specified time period.

Such a performance snapshot can then be analyzed to identify particular sequences of performance degradation, including performance jitter. In embodiments, hundreds, thousands, or more of such time sequences are analyzed in order to identify a correlation between a particular sequence activity (e.g., of one or more tasks or threads) and similar instances of performance degradation. In an embodiment, a clustering algorithm is employed to narrow the focus of activities as a cause of the performance degradation. Various types of clustering techniques can include one or more of K-means clustering, Mean-shift clustering, Density-based spatial clustering, Expectation-Maximization clustering using Gaussian Mixture Models (GMM), and others known to those of ordinary skill in the art. In embodiments, a Pearson correlation is used for time series' samples, where say $\{x_1, \ldots, x_n\}$ correspond to samples taken at sequential time intervals $\{(t_1, \ldots, t_n)\}$. Then we use absolute values of pairwise correlations as an affinity measure to find-clusters of flows (time-series) with similar time behavior In an embodiment, data from the performance counters are filtered and/or normalized prior to application of clustering. For example, the mean value for a particular counter can be normalized to zero and the standard deviation normalized to 1. In an embodiment, the performance counter data is filtered with a low-pass filter to remove noise.

At 830, based on the clustering analysis results, a source of performance degradation is identified. For example, based upon clustering of numerous time sequences, the activity of the thread(s) associated with preparation of destage is associated with a system-wide performance jitter.

In an embodiment, once a probable identification of the source of performance degradation is made, adjustments to the operation of the threads can be made at 840. For example, a smoothing (or balancing) of operations of the identified task (e.g., preparing destage) could be made to reduce the spike and performance jitter associated with the task. Of course, in embodiments, multiple tasks/processes could be correlated with performance degradation and addressed at 840.

Figure 9A:
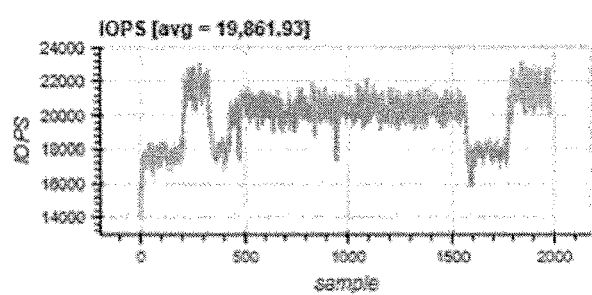
FIG. 9A shows a chart of example performance information for IOPS (IOs per second) for a system and FIG. 9B shows latency performance information.
Figure 9B:
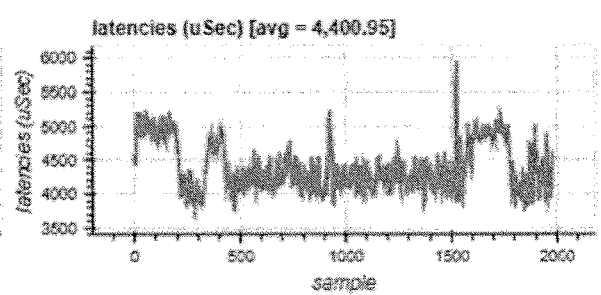

FIG. 9A shows an example IO-rate performance information for IOPS (IOs per second) for a system and FIG. 9B shows IO-latency performance information. As can be seen, there is some performance jitter, such around 1600 to about 1800 µsec. The number of IOPS has a trough and the latency has a corresponding spike.

Figure 10A:
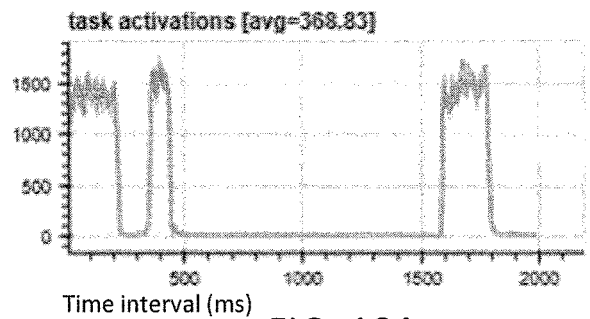
FIGS. 10A and 10B are charts of task activations and run time counters, respectively, of a background destage process obtained during a performance snapshot according to embodiments.
Figure 10B:
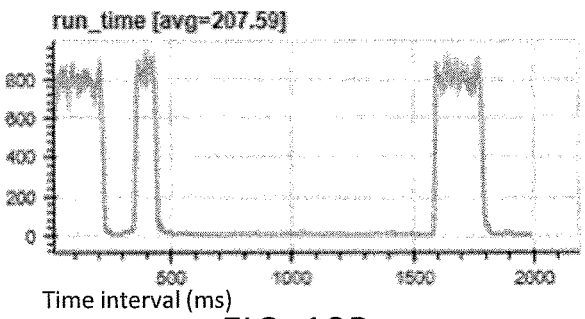
Figure 11A:
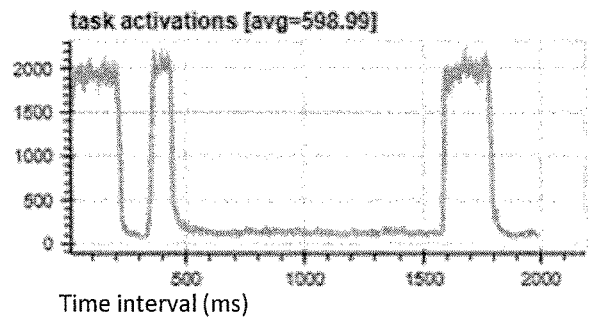
FIGS. 11A and 11B are charts of task activations and run time counters, respectively, of a background cleaning process obtained during a performance snapshot according to embodiments.
Figure 11B:
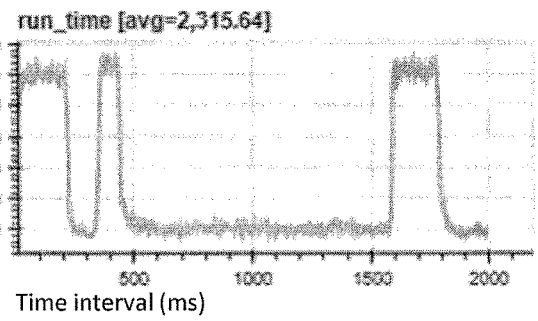
Figure 12A:
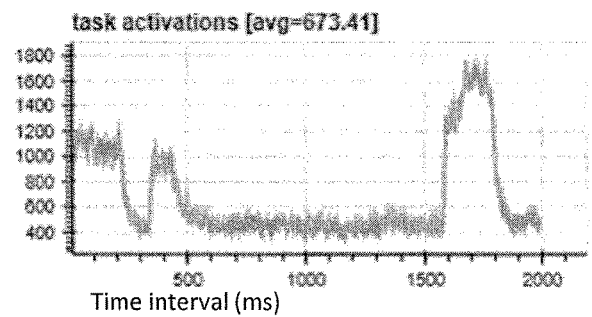
FIGS. 12A and 12B are charts of task activations and run time counters, respectively, of a destage preparation process obtained during a performance snapshot according to embodiments.
Figure 12B:
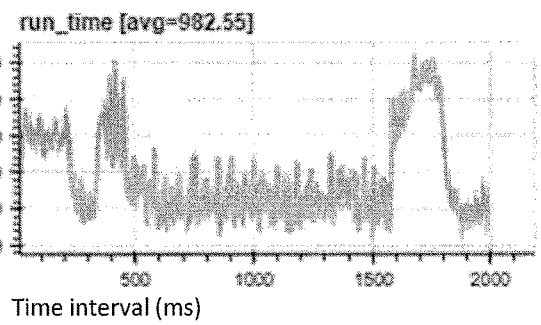
Figure 13A:
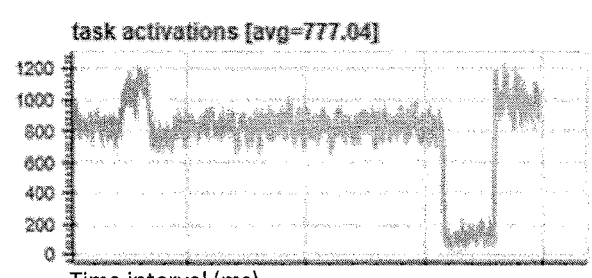
FIGS. 13A and 13B are charts of task activations and run time counters, respectively, of another destage preparation process obtained during a performance snapshot according to embodiments.
Figure 13B:
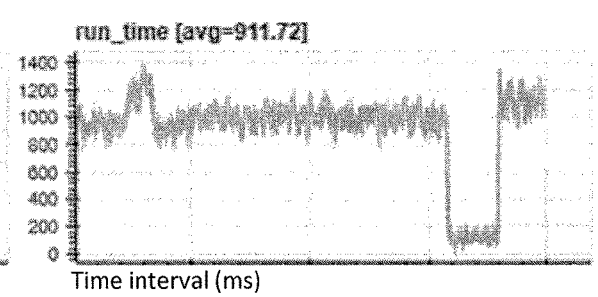

Upon detection of performance degradation in form of jitter, the system selects a given number of performance sequences that most closely correlate with the IOPS jitter found in FIG. 9A. For example, the system may select 20 sequences out of 20,000 sequences that have the highest correlation. FIG. 10A shows the number of task activations over time for background destage process and FIG. 10B shows a run time average. FIG. 11A shows task activations for a background cleaner process and FIG. 11B shows the corresponding run time average. FIG. 12A shows task activations for a prepare destage process and FIG. 12B shows the corresponding run time average. FIG. 13A shows task activations for a further background cleaner process and FIG. 13B shows the corresponding run time average. These activation and run time plots show tasks having a dynamic is highly correlated with the jittering IO performance.

The sequences above show causes of the performance jitter and consequences of the jitter. In the illustrated embodiment, the cause of the performance jitter is a jumpy activation rate of the write-cache destager of FIGS. 10A and 10B. The remaining data sequences, e.g., FIGS. 11A-13B), are the consequences of the performance jitter. In embodiments, after identifying a relatively small subset of the flows that are highly correlated with the jittering performance, the cause can be readily identified, such as by an expert. Embodiments of the invention select a relatively small subset of theoretically possible hypotheses for consideration of the cause of performance degradation, such as jitter. That is, the number of candidate for the cause of the performance degradation is significantly reduced as compared to conventional approaches Since the write-cache destage appears to cause a bug in the form of IO performance jitter, the system can recommend and/or implement smoothing of write-cache destager activities. In embodiments, the system throttles the quantity of work performed by the write-cache destage during short time intervals but at the same time the write-cache destage is executed more frequently. This way the total amount of work stays constant.

Figure 14:
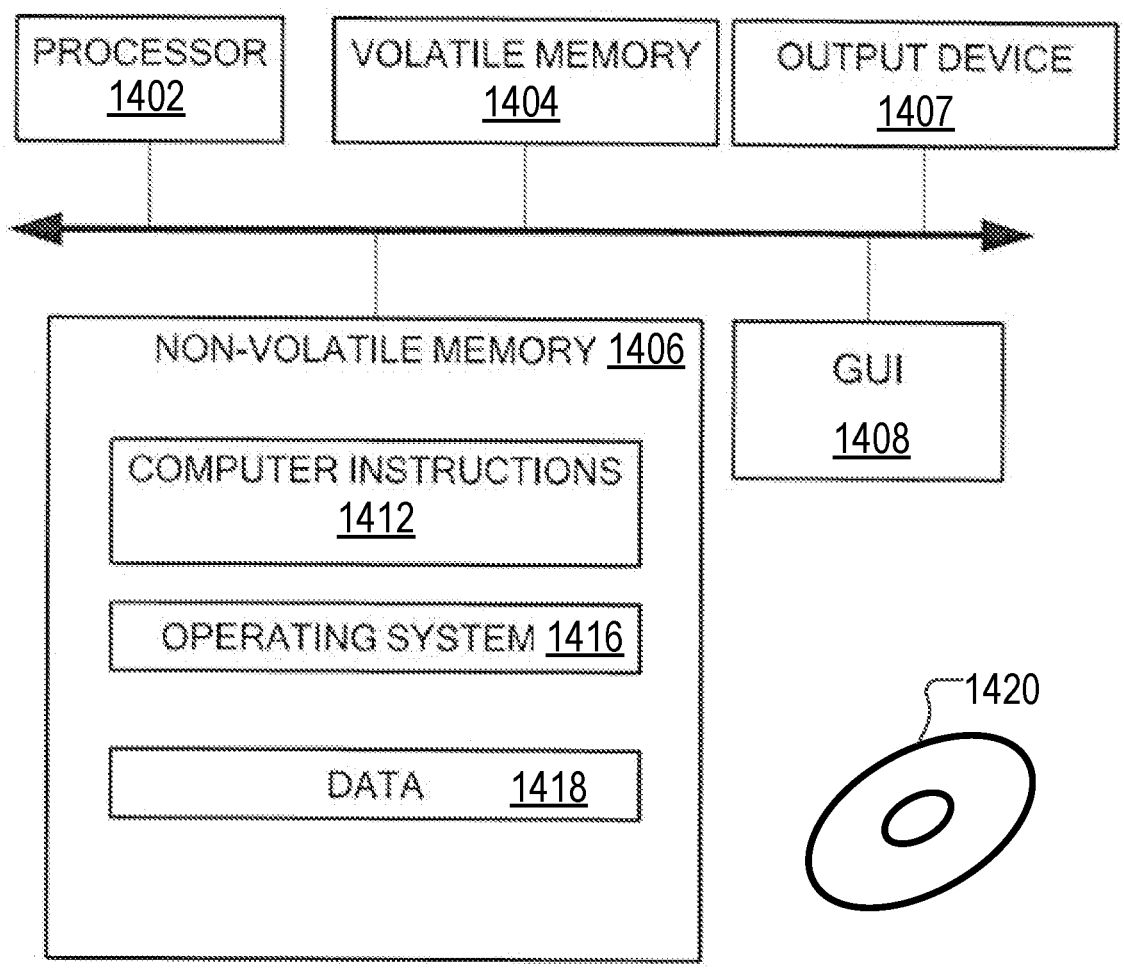
FIG. 14 is a block diagram of an example of a computer that may perform at least a portion of the processing described herein.

Referring to FIG. 14, in some embodiments, source site 102 and/or target site 112 may be implemented as one or more computers. Computer 1400 may include processor 1402, volatile memory 1404 (e.g., RAM), non-volatile memory 1406 (e.g., a hard disk drive, a solid state drive such as a flash drive, a hybrid magnetic and solid state drive, etc.), graphical user interface (GUI) 1408 (e.g., a touchscreen, a display, and so forth) and input/output (I/O) device 1420 (e.g., a mouse, a keyboard, etc.). Non-volatile memory 1406 stores computer instructions 1412, an operating system 1416 and data 1418 such that, for example, the computer instructions 1412 are executed by the processor 1402 out of volatile memory 1404 to perform at least a portion of processes 400 and 420' (FIGS. 4 and 5). Program code may be applied to data entered using an input device of GUI 1408 or received from I/O device 1420.

Processes 400 and 420' (FIGS. 4 and 5) are not limited to use with the hardware and software of FIG. 14 and may find applicability in any computing or processing environment and with any type of machine or set of machines that may be capable of running a computer program. Processes 400 and 420' (FIGS. 4 and 5) may be implemented in hardware, software, or a combination of the two.

The processes described herein are not limited to the specific embodiments described. For example, processes 400 and 420' are not limited to the specific processing order shown in FIGS. 4 and 5. Rather, any of the blocks of processes 400 and 420' may be re-ordered, combined or removed, performed in parallel or in serial, as necessary, to achieve the results set forth herein.

Processor 1402 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in an application specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

What is claimed is:

1. A computer implemented method comprising:
   generating one or more threads to operate a storage system, the storage system comprising one or more system resources, and each of the one or more threads associated with one of a plurality of tasks of the storage system;
   updating one or more performance counters of the storage system in response to a change in operating state of one of the one or more threads;
   generating performance snapshots by sampling a state of the tasks associated with the threads and the performance counters, any of the performance snapshots including one or more task-specific directed graphs;
   identifying one or more intervals of performance degradation of the storage system from the performance snapshots; and clustering time-series of samples from the performance snapshots to identify one or more of the plurality of tasks as a cause of any of the intervals of performance degradation.

2. The method of claim 1, wherein the performance degradation comprises an interval of relatively slower execution of the one or more of the plurality of tasks.

3. The method of claim 1 wherein the performance degradation comprises performance-jitter of the storage system for at least one data sequence.

4. The method of claim 1, further comprising associating the one or more performance counters with a given task, the one or more performance counters comprising one or more of a counter for accumulating a number of accesses of an associated resource by the given task and a counter for accumulating a number of requested units from the associated resource by the given task.

5. The method of claim 1, further comprising associating the one or more performance counters with a given task, the one or more performance counters comprising one or more of: a counter for accumulating a time of the given task in a suspended state, a counter for determining a number of suspended requests to an associated resource by the given task, and performance counters associated with sequences of processing instructions comprising one or more of: a counter for accumulating a number of passes of the given task, a counter for accumulating a time of one or more operating states of the given task, and a counter for accumulating a number of cooperative yields of the given task.

6. The method of claim 1 wherein identifying one or more intervals of performance degradation comprises applying a low pass filter to the performance snapshots to remove sampling noise from the performance snapshots.

7. The method of claim 1 wherein identifying one or more intervals of performance degradation comprises normalizing the performance snapshots such that the mean value of one or more performance counters is normalized to zero and the standard deviation of the one or more performance counters normalized to one.

8. The method of claim 1 further comprising modifying an execution of at least one of the tasks to reduce further occurrences of performance degradation of the storage system that were identified.

9. The method of claim 8 wherein modifying execution comprises smoothing a sequence of execution of the at least one of the tasks.

10. The method of claim 1, wherein the clustering of time-series of samples from the performance snapshots is performed by using a clustering technique, the clustering technique including at least one of K-means clustering, Mean-shift clustering, Density-based spatial clustering, Expectation-Maximization clustering using Gaussian Mixture Models (GMM).

11. A computer processing system comprising:
one or more processors programmed and configured to cause the execution of:
generating one or more threads to operate a storage system, the storage system comprising one or more system resources, and each of the one or more threads associated with one of a plurality of tasks of the storage system;
updating one or more performance counters of the storage system in response to a change in operating state of one of the one or more threads;
generating performance snapshots by sampling a state of the tasks associated with the threads and the performance counters, any of the performance snapshots including one or more task-specific directed graphs;
identifying one or more intervals of performance degradation of the storage system from the performance snapshots; and
clustering time-series of samples from the performance snapshots to identify one or more of the plurality of tasks as a cause of any of the intervals of performance degradation.

12. The system of claim 11, wherein the performance degradation comprises an interval of relatively slower execution of the one or more of the plurality of tasks.

13. The system of claim 11 wherein the performance degradation comprises performance-jitter of the storage system.

14. The system of claim 11, wherein the one or more processors are further configured to associate the one or more performance counters with a given task, the one or more performance counters comprising one or more of a counter for accumulating a number of accesses of an associated resource by the given task and a counter for accumulating a number of requested units from the associated resource by the given task.

15. The system of claim 11, wherein the one or more processors are further configured to associate the one or more performance counters with a given task, the one or more performance counters comprising one or more of: a counter for accumulating a time of the given task in a suspended state, a counter for determining a number of suspended requests to an associated resource by the given task, and performance counters associated with sequences of processing instructions comprising one or more of: a counter for accumulating a number of passes of the given task, a counter for accumulating a time of one or more operating states of the given task, and a counter for accumulating a number of cooperative yields of the given task.

16. The system of claim 11 wherein identifying one or more intervals of performance degradation comprises applying a low pass filter to the performance snapshots to remove sampling noise from the performance snapshots.

17. The system of claim 11 wherein identifying one or more intervals of performance degradation comprises normalizing the performance snapshots such that the mean value of one or more performance counters is normalized to zero and the standard deviation of the one or more performance counters normalized to one.

18. The system of claim 11 wherein the one or more processors are configured to modify an execution of at least one of the tasks to reduce further occurrences of the intervals of performance degradation of the storage system that were identified.

19. The system of claim 11, wherein the clustering of time-series of samples from the performance snapshots is performed by using a clustering technique, the clustering technique including at least one of K-means clustering, Mean-shift clustering, Density-based spatial clustering, Expectation-Maximization clustering using Gaussian Mixture Models (GMM).

20. The system of claim 18 wherein modifying execution comprises smoothing a sequence of execution of the at least one of the tasks.

* * * * *